Aug. 24, 1937.    R. T. OSMAN    2,091,009
COUPLING DEVICE
Filed April 18, 1935
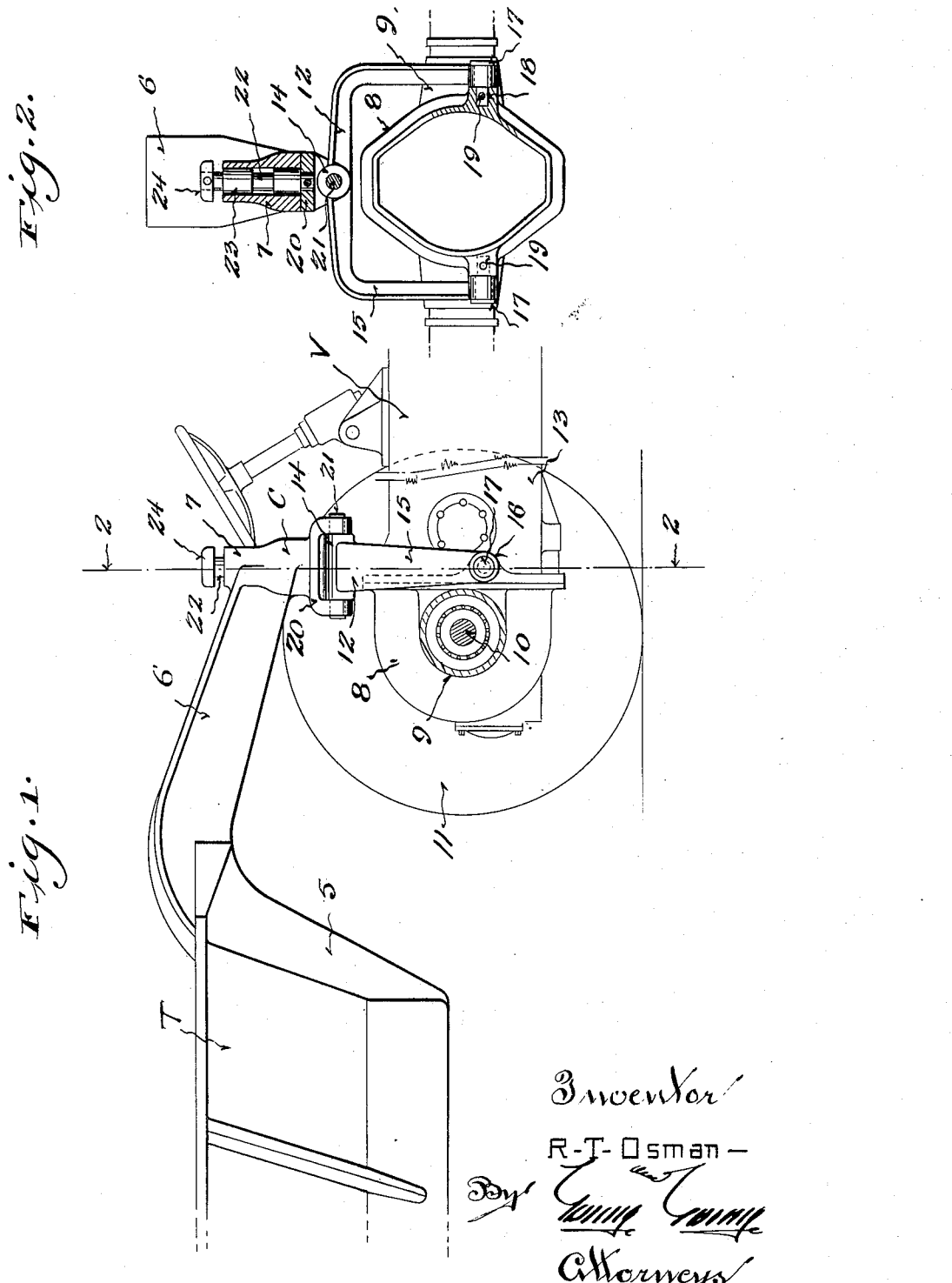
Inventor
R. T. Osman
By
Attorneys Patented Aug. 24, 1937

2,091,009

UNITED STATES PATENT OFFICE 2,091,009

COUPLING DEVICE

Ralph T. Osman, Milwaukee, Wis.

Application April 18, 1935, Serial No. 17,887

1 Claim. (Cl. 280—33.44)

This invention appertains to coupling devices, and more particularly to novel means for coupling a trailing vehicle or implement to a tractor.

One of the primary objects of my invention is to provide a novel device for coupling a trailer to a tractor forwardly of and below the rear live axle thereof, whereby the pulling stress on the tractor will tend to hold the front end of the tractor down, and thereby facilitate steering, etc., and prevent the tractor from having a tendency to rear back.

Another important object of my invention is the provision of novel means for forming the coupling device itself, whereby a substantially universal joint connection will be had between the trailer and tractor, so that the proper tracking of the trailer in rear of the tractor will be had irrespective of ground contour and the like.

A further salient object of my invention is the provision of a yoke-shaped frame straddling the tractor frame rockably mounted on pivots carried by the transmission housing or adjacent frame points having rockably connected at right angles thereto a second yoke carrying the spindle for receiving the vertical bearing of the trailer tongue, the resultant connection allowing swinging of the tongue in vertical and horizontal planes, as well as lateral tilting of the tongue.

A still further object of my invention is to provide an improved trailer hitch of the above character, which will be durable and efficient in use, one that will be simple and easy to manufacture, and one which can be incorporated with a tractor at a small cost.

With these and other objects in view, the invention consists in the novel construction, arrangement, and formation of parts, as will be hereinafter more specifically described, claimed, and illustrated in the accompanying drawing, in which drawing:

Figure 1 is a side elevation of my improved hitch, showing the same applied to a tractor and trailing vehicle, only parts of the tractor and vehicle being shown.

Figure 2 is a vertical section taken substantially on the line 2—2 of Figure 1, looking in the direction of the arrows.

Referring to the drawing in detail, wherein similar reference characters designate corresponding parts throughout the several views, the letter C generally indicates my improved coupling device or hitch for connecting a trailer T to the tractor or drawing vehicle V.

The trailer T can be of any desired character or form, and in the present drawing the same has been shown to be of the dump wagon type. The body 5 of the trailer has rigidly connected thereto any desired type of tongue 6. The forward end of the tongue 6 is provided with a centrally disposed vertical bearing 7, the purpose of which will be later set forth.

The tractor V can also be of any desired type or make, and includes the differential casing 8 supporting the outwardly extending axle housings 9 for the rear live axle 10. The outer ends of the rear axle have connected thereto any desired type of ground wheels 11.

My improved coupling device C comprises a main U-shaped frame or yoke 12, which is adapted to straddle the transmission casing 13 of the tractor. The yoke 12 extends transversely of the tractor, and has formed on its upper end and centrally thereof the horizontally disposed bearing sleeve 14. This bearing sleeve 14 extends transversely of the yoke 12, and on the longitudinal axis of the tractor.

The lower terminals of the arms 15 of the yoke 12 have formed thereon bearings 16, which are adapted to receive headed pivot pins or stub shafts 17. These headed pins or stub shafts 17 are received within sockets 18 cast on the differential casing. Suitable cotter keys or the like 19 can be employed for detachably holding the pivot pins or stub shafts 17 against accidental displacement.

Extending transversely of the yoke 12 is a second yoke 20, and a pivot shaft 21 rockably connects the yoke 20 with the bearing sleeve 14 formed on the main yoke 12. Formed on or rigidly secured to the second yoke 20 is the vertically extending spindle 22, which is adapted to receive the vertical bearing 7 formed on the tongue 6 of the trailer T. Suitable bearing bushings 23 can be placed between the vertical bearing 7 and the spindle 22. A collar 24 is connected to the upper end of the spindle so as to limit the sliding movement of the bearing 7 on the spindle.

By this arrangement and formation of parts, the trailer T is coupled to the tractor V in front of and below the rear axle 10, so that the pulling stress exerted by the trailer on the tractor is below and in front of the axle 10. This prevents the rearing back of the tractor and tends to hold the front end of the tractor firmly on the ground.

The mounting of the main yoke 15 allows the trailer to move up and down over rough ground, and the trailer can swing on the spindle 22 when the tractor and trailer are rounding curves and the like. The horizontal pivot 21 allows lateral tilting of the tongue and trailer when the trailer is positioned on the uneven ground.

From the foregoing description, it can be seen that I have provided an exceptionally simple and durable means for connecting a trailer to a drawing vehicle, such as a tractor.

Changes in details may be made without departing from the spirit or the scope of my invention, but what I claim as new is:

The combination with a tractor having a frame including an axle housing, a differential housing, and a transmission housing, a rear axle in the axle housing, laterally projecting lugs on the transmission housing in front of and below the axle, pivot pins supported by said lugs, and a trailer having a tongue projecting over the axle housing and the transmission housing, of a coupling device including a transversely extending, inverted U-shaped yoke straddling the transmission housing in front of the axle housing, bearings on the lower ends of the arms of the yoke receiving the pivot pins, a spindle rockably connected to the yoke on a horizontal pivot and at right angles to the pivot pins, and a vertical bearing connecting the forward end of the tongue to the spindle.

RALPH T. OSMAN.